(12) United States Patent
Miyazaki

(10) Patent No.: US 7,043,207 B2
(45) Date of Patent: May 9, 2006

(54) FADING FREQUENCY ESTIMATING APPARATUS

(75) Inventor: Shunji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/034,629

(22) Filed: Jan. 13, 2005

(65) Prior Publication Data
US 2005/0118960 A1  Jun. 2, 2005

Related U.S. Application Data

(63) Continuation of application No. PCT/JP03/00896, filed on Jan. 30, 2003.

(51) Int. Cl.
*H04B 17/00* (2006.01)
*H04B 15/00* (2006.01)
*H03D 1/04* (2006.01)

(52) U.S. Cl. ................ 455/67.11; 455/115.1; 455/504; 375/346; 375/224; 375/344

(58) Field of Classification Search ........ 455/522, 455/452.2, 446, 506, 504, 501, 67.11, 67.13, 455/67.16, 68, 65, 115.1; 370/208, 252, 370/281, 295, 343, 344, 430, 480, 481; 375/132, 375/136, 220, 221, 222, 231, 346, 347, 343, 375/344, 224, 148, 371, 150, 360
See application file for complete search history.

(56) References Cited

U.S. PATENT DOCUMENTS

| | | | | |
|---|---|---|---|---|
| 5,375,143 A | * | 12/1994 | Kazecki et al. | 375/233 |
| 6,563,861 B1 | * | 5/2003 | Krasny et al. | 375/150 |
| 6,680,967 B1 | * | 1/2004 | Westman | 375/148 |
| 6,680,969 B1 | * | 1/2004 | Molnar et al. | 375/224 |
| 2002/0172307 A1 | * | 11/2002 | Sandberg | 375/344 |

FOREIGN PATENT DOCUMENTS

| | | |
|---|---|---|
| JP | 7-140232 | 6/1995 |
| JP | 7-162360 | 6/1995 |
| JP | 8-079161 | 3/1996 |
| JP | 8-163107 | 6/1996 |
| JP | 8-223108 | 8/1996 |

(Continued)

OTHER PUBLICATIONS

May 1998 IEEE vol. 46, No. 5, pp. 686-694: "Optimal Decision Strategies for Acquistion of Spread-Spectrum Signals in Frequency- Selective Fading Channels." by Roland R. Rick et al.*

(Continued)

*Primary Examiner*—Edan Orgad
(74) *Attorney, Agent, or Firm*—Katten Muchin Rosenman LLP

(57) ABSTRACT

The invention relates to a fading frequency estimating apparatus that performs a predetermined signal processing on a radio frequency signal that arrives through a radio transmission channel, to estimate a frequency of fading occurring on the radio transmission channel. An object of the present invention is to quickly and accurately estimate a fading frequency without need to use a very complicated structure. The fading frequency estimating apparatus includes a frequency analyzing section obtaining at two instances a frequency spectrum of a sequence of differences in instantaneous values of envelop of signals that chronologically arrive through the radio transmission channel, the two instances apart from each other with an interval necessary for a characteristic of the radio transmission channel to be steady, and it includes an estimating section estimating a frequency of fading to be such a frequency that the magnitude of the frequency spectrum is to be maximum.

28 Claims, 10 Drawing Sheets

| | FOREIGN PATENT DOCUMENTS | |
|---|---|---|
| JP | 9-135215 | 5/1997 |
| JP | 2000-106576 | 4/2000 |
| JP | 2001-223671 | 8/2001 |
| JP | 2001-345760 | 12/2001 |
| JP | 2001-358621 | 12/2001 |

OTHER PUBLICATIONS

International Search Report dated Apr. 30, 2003.

* cited by examiner

FADING FREQUENCY ESTIMATING APPARATUS

CROSS-REFERENCE TO RELATED APPLICATION

This application is a continuation of International Application PCT/JP2003/000896, filed Jan. 30, 2003, and designating the U.S., the content of which is herein incorporated by reference.

BACKGROUND OF THE INVENTION

1. Field of the Invention

The present invention relates to a fading frequency estimating apparatus which performs a predetermined signal processing on a radio frequency signal that arrives through a radio transmission channel so as to estimate a frequency of fading that occurs in the radio transmission channel.

2. Description of the Related Art

In mobile communication systems, a channel control, a transmission power control, and a traffic control are performed in cooperation with a radio base station and a terminal in accordance with a frequency allocation, a zone structure, a channel allocation, a multiple access system, a modulating system, and so forth.

In a mobile communication system in accordance with the Code Division Multiple Access (CDMA) system, the benefits thereof are being actively used so as to provide a variety of services for transmitting video information and other types of digital information at high speed.

Thus, the foregoing channel control, transmission power control, and traffic control are being flexibly and quickly accomplished in accordance with for example variation of a fading frequency and other characteristics of radio transmission channels.

Conventionally, the fading frequency is obtained by the use of the related art technologies disclosed in the following Patent Document 1 and Patent Document 2.

In fading pitch estimating apparatus (translated title) described in "Patent Document 1," the absolute values of differences in received signals sampled at intervals of a predetermined period are cumulated. The cumulated result is converted into a fading pitch in accordance with known correlation therebetween.

However, in the fading pitch estimating apparatus, a curve that represents the foregoing correlation does not always uniquely correspond to frequencies. Even if the curve uniquely corresponds to frequencies, unless self-correlated results are integrated for many samples (long time), a fading pitch cannot be obtained with sufficient accuracy.

In fading pitch detecting apparatus and portable information terminal using the same (translated title) described in "Patent Document 2," signals are output from a plurality of despreaders that despread radio waves for individual paths in a multipath environment. The signals are combined while phase differences in the individual paths are kept. A correlation period at which the self-correlated value of the obtained signals is the minimum is substituted into a known formula. As a result, a fading pitch is obtained.

However, the fading pitch detecting apparatus and portable information terminal using the same cannot be used for radio transmission systems in accordance with multiple access systems other than the CDMA system. In addition, unless many self-correlated values are integrated, a fading pitch cannot be obtained with sufficient accuracy.

In addition to the foregoing related art technologies of the present invention, for example, Patent Document 3 to Patent Document 5 are the related art technologies of the present invention.

In moving speed detecting apparatus for mobile station having receiving unit (translated title) described in "Patent Document 3," a pilot signal is extracted from a received signal. The Fast Fourier Transform is performed for the extracted pilot signal. The maximum Doppler shift of the pilot signal is detected as a frequency at which the slope of the obtained frequency spectrum becomes the minimum.

However, in the traveling speed detecting apparatus for mobile station having receiving unit, unless a frequency spectrum of a sequence of many instantaneous values that represent a pilot signal extracted from a received signal is obtained, the frequency at which the slope of the frequency spectrum is the minimum cannot be obtained with sufficient accuracy.

In frequency estimating apparatus (translated title) described in "Patent Document 4," a frequency power spectrum of a carrier wave is obtained from a received signal. A carrier frequency is obtained as the average value of frequencies at which the power is low in predetermined high band and low band against a peak frequency (equivalent to the maximum Doppler shift) corresponding to a peak value of the frequency power spectrum.

In synchronization tracking apparatus (translated title) described in "Patent Document 5," a frequency at which the value of power (power density) of a frequency spectrum obtained by the Fast Fourier Transform is the maximum is obtained as the maximum Doppler frequency.

However, in these frequency estimating apparatus and synchronization tracking apparatus, the frequency power spectrum (frequency spectrum) of frequencies other than the foregoing pitch frequency (the maximum Doppler frequency) may contain a value similar to the peak value (the maximum value).

Thus, the pitch frequency (the maximum Doppler frequency) does not always have high accuracy and response.

Patent Document 1

Japanese Unexamined Patent Application Publication No. HEI 8-79161

Patent Document 2

Japanese Unexamined Patent Application Publication No. 2001-223671

Patent Document 3

Japanese Unexamined Patent Application Publication No. HEI 7-140232

Patent Document 4

Japanese Patent No. 3296421 Japanese Unexamined Patent Application Publication No. 2000-106576)

Patent Document 5

Japanese Unexamined Patent Application Publication No. HEI 8-163107

SUMMARY OF THE INVENTION

An object of the present invention is to provide a fading frequency estimating apparatus that can quickly and accurately estimate a fading frequency without need to use a very complicated structure.

In addition, an object of the present invention is to accurately estimate a fading frequency even if the number of values to be referenced for a frequency spectrum is small.

In addition, an object of the present invention is to effectively use the existing hardware and inexpensively, accurately, and effectively estimate a fading frequency.

In addition, an object of the present invention is to more accurately estimate a fading frequency than the case that a frequency as an estimated value of a fading frequency is obtained in accordance with a signal that arrives through only a single path.

In addition, an object of the present invention is to accurately and stably estimate a fading frequency even in a situation that transmission quality largely varies.

In addition, an object of the present invention is to accurately estimate a fading frequency of fading that occurs on a radio transmission channel and that concentrates in a narrow band such as fading in a multipath environment, with a stable characteristic, even if an interference wave or disturbance wave having a large level is superimposed onto a radio wave.

In addition, an object of the present invention is to improve the accuracy of an estimated value of a fading frequency as long as the process amount, storage capacity, and other resources can be increased and the response can be slowed to obtain the latest frequency spectrum.

In addition, an object of the present invention is to improve the performance of a variety of radio transmission systems and radio units and their general reliability and secure resources for improving added values.

The foregoing object can be accomplished by a fading frequency estimating apparatus for obtaining a frequency spectrum of a sequence of differences in instantaneous values of envelop components at two instances apart for which a characteristic of a radio transmission channel is considered to be steady from components of a signal that chronologically arrives through the radio transmission channel and estimating a frequency of fading that occurs on the radio transmission channel to be a frequency at which the level of the frequency spectrum is the maximum.

This fading frequency estimating apparatus can obtain a frequency spectrum without necessity of most of components of steady amplitudes of a signal that arrives on the radio transmission channel. The frequency spectrum has the maximum value that is steep at the fading frequency of the fading that occurs on the radio transmission channel.

The foregoing object can be accomplished by a fading frequency estimating apparatus for obtaining the difference in frequency spectrums of signals that chronologically arrive through a radio transmission channel in two periods, at both the start point and the end point or either thereof of each of the two periods a characteristic of the radio transmission channel being considered to be steady, and estimating a frequency of fading that occurs on the radio transmission channel to be a frequency at which the difference in the frequency spectrums is the maximum.

In this fading frequency estimating apparatus, the frequency spectrums are mathematically equivalent to the frequency spectrums obtained by the foregoing fading frequency estimating apparatus.

In addition, the foregoing object can be accomplished by a fading frequency estimating apparatus for obtaining a frequency spectrum of a sequence of differences in chronologically estimated channel values of a radio transmission channel at two instances apart for which a characteristic of the radio transmission channel is considered to be steady and estimating a frequency of fading that occurs on the radio transmission channel to be a frequency at which the level of the frequency spectrum is the maximum.

In this fading frequency estimating apparatus, the difference in estimated channel values contained in the sequence of the differences in the estimated channel values is considered to be equal to the difference in the amplitudes of the first fading frequency estimating apparatus because the estimated channel values represent a transmission characteristic of a radio transmission channel through which signals are transmitted as long as the level of transmission waves equivalent to these signals is constant or known.

In addition, the possibility of which these estimated channel values are obtained by the existing hardware of the receiving system according to the present invention is high.

In addition, the foregoing object can be accomplished by a fading frequency estimating apparatus for obtaining the difference in frequency spectrums of sequences of chronologically estimated channel values of a radio transmission channel in two periods on the time axis, at both a start point and an end point or either thereof of each of the two periods a characteristic of the radio transmission channel being considered to be steady, and estimating a frequency of fading that occurs on the radio transmission channel to be a frequency at which the difference in the frequency spectrums is the maximum.

In this fading frequency estimating apparatus, the frequency spectrums are mathematically equivalent to the frequency spectrums obtained by the foregoing fading frequency estimating apparatus.

In addition, the foregoing object can be accomplished by a fading frequency estimating apparatus for obtaining a frequency spectrum of sequences of differences in estimated channel values for each path that forms the radio transmission channel and obtaining, as a sum of the frequency spectrums, a frequency spectrum of a sequence of differences in estimated channel values of the radio transmission channel.

In this fading frequency estimating apparatus, an estimated value of a fading frequency is obtained as a frequency at which the power is the maximum in the sum of frequency spectrums of signals that arrive through major paths in a multipath environment of a radio transmission channel.

In addition, the foregoing object can be accomplished by a fading frequency estimating apparatus for obtaining the difference in frequency spectrums of sequences of estimated channel values for each path that forms the radio transmission channel and obtaining, as a sum of the frequency spectrums, the difference in frequency spectrums of sequences of estimated channel values of the radio transmission channel.

In this frequency estimating apparatus, the frequency spectrums are mathematically equivalent to the frequency spectrums obtained by the foregoing fading frequency estimating apparatus.

The foregoing object can be accomplished by a fading frequency estimating apparatus for being pre-assigned two coefficients with which a frequency spectrum is to be steep at a frequency of which the level of the frequency spectrum is the maximum and obtaining a frequency spectrum of sequences of differences in instantaneous values as the sum of products of these coefficients and envelop components at the two instances.

In this fading frequency estimating apparatus, a frequency spectrum is obtained in the following two modes in accordance with the two coefficients without excessive components of steady amplitudes of signals.

In a low band, a variation component superimposed due to fading can be distinguished from noise superimposed due to a factor other than fading in accordance with the maximum value of the power.

In a high band, the difficulty for determining whether noise superimposed onto an envelope component is caused by fading can be alleviated.

In addition, the foregoing object can be accomplished by a fading frequency estimating apparatus for being pre-assigned two coefficients with which the difference in frequency spectrums is to be steep at a frequency of which the difference in the frequency spectrums is the maximum and obtaining the difference as the sum of products of these coefficients and the frequency spectrums of signals.

In this frequency estimating apparatus, the frequency spectrums are mathematically equivalent to the frequency spectrums obtained by the foregoing fading frequency estimating apparatus.

In addition, the foregoing object can be accomplished by a fading frequency estimating apparatus for being pre-assigned two coefficients with which a frequency spectrum is to be steep at a frequency of which the level of the frequency spectrum is the maximum and obtaining a frequency spectrum of a sequence of differences in instantaneous values as the sum of products of these coefficients and estimated channel values at two instances.

In this fading frequency estimating apparatus, a frequency spectrum is obtained in the following two modes in accordance with the two coefficients without excessive components of steady amplitudes of signals.

In a low band, a variation component superimposed due to fading can be distinguished from noise superimposed due to a factor other than fading in accordance with the maximum value of the power.

In a high band, the difficulty for determining whether noise superimposed onto an envelope component is caused by fading can be alleviated.

In addition, the foregoing object can be accomplished by a fading frequency estimating apparatus for being pre-assigned two coefficients with which the difference in frequency spectrums is to be steep at a frequency of which the difference in the frequency spectrums is the maximum and obtaining the difference as the sum of products of these coefficients and frequency spectrums of sequences of discretely estimated channel values of a radio transmission channel in different periods.

In this frequency estimating apparatus, the frequency spectrums are mathematically equivalent to the frequency spectrums obtained by the foregoing fading frequency estimating apparatus.

In addition, the foregoing object can be accomplished by a fading frequency estimating apparatus for pre-storing two coefficients with which a frequency spectrum is to be steep in accordance with the transmission quality of a radio transmission channel at a frequency of which the level of the frequency spectrum is the maximum and obtaining a frequency spectrum of a sequence of differences in instantaneous values as the sum of products of the two coefficients stored in accordance with the transmission quality and envelop components at two instances.

In this fading frequency estimating apparatus, a frequency spectrum is accurately obtained in the following two modes even if suitable values of the two coefficients vary as the transmission quality varies.

In a low band, a variation component superimposed due to fading can be distinguished from noise superimposed due to a factor other than fading in accordance with the maximum value of the power.

In a high band, the difficulty for determining whether noise superimposed onto an envelop component is caused by fading can be alleviated.

In addition, the foregoing object can be accomplished by a fading frequency estimating apparatus for pre-storing two coefficients with which the difference in frequency spectrums is to be steep in accordance with the transmission quality of a radio transmission channel at a frequency of which the difference is the maximum and obtaining the difference as the sum of products of the two coefficients pre-stored in accordance with the transmission quality and frequency spectrums of signals.

In the fading frequency estimating apparatus, the frequency spectrums are mathematically equivalent to the frequency spectrums obtained by the foregoing fading frequency estimating apparatus.

In addition, the foregoing object can be accomplished by a fading frequency estimating apparatus for pre-storing two coefficients with which a frequency spectrum is to be steep in accordance with the transmission quality of a radio transmission channel at a frequency of which the level of the frequency spectrum is the maximum and obtaining a frequency spectrum of a sequence of differences in instantaneous values as the sum of products of the two coefficients pre-stored in accordance with the transmission quality and estimated channel values estimated at two instances.

In the fading frequency estimating apparatus, a frequency spectrum is accurately obtained in the following two modes even if suitable values of the two coefficients vary as the transmission quality varies.

In a low band, a variation component superimposed due to fading can be distinguished from noise superimposed due to a factor other than fading in accordance with the maximum value of the power.

In a high band, the difficulty for determining whether noise superimposed onto an envelop component is caused by fading can be alleviated.

In addition, the foregoing object can be accomplished by a fading frequency estimating apparatus for pre-storing two coefficients with which the difference in frequency spectrums is to be steep in accordance with the transmission quality of a radio transmission channel at a frequency of which the difference is the maximum and obtaining the difference as the sum of products of the two coefficients pre-stored in accordance with the transmission quality and frequency spectrums of sequences of discretely estimated channel values of the radio transmission channel in two periods.

In the fading frequency estimating apparatus, the frequency spectrums are mathematically equivalent to the frequency spectrums obtained by the foregoing fading frequency estimating apparatus.

In addition, the foregoing object can be accomplished by a fading frequency estimating apparatus for estimating a frequency of fading that occurs on a radio transmission channel to be a frequency at which the level is the maximum in a frequency band in which a change rate of the frequency spectrum is the maximum.

In the fading frequency estimating apparatus, a frequency that is closest to a frequency band in which a change rate of a frequency spectrum is the maximum on the frequency axis and at which the power of the frequency spectrum is the maximum is estimated to be a fading frequency.

In addition, the foregoing object can be accomplished by a fading frequency estimating apparatus for integrating plurality of pre-obtained frequency spectrums so as to obtain the latest frequency spectrum.

In this fading frequency estimating apparatus, an error component contained in each pre-obtained frequency spectrum is suppressed.

In addition, the foregoing object can be accomplished by a fading frequency estimating apparatus for estimating a fading frequency to be an average value of frequencies at which the levels of a plurality of frequency spectrums each are the maximum or an average value of frequencies at which the levels of differences in all pairs of a plurality of frequency spectrums each are the maximum.

In this fading frequency estimating apparatus, a fading frequency is accurately estimated to be an average value of frequencies at which the levels of frequency spectrums each are the maximum or to be an average value of frequencies at which the levels of differences in all pairs of frequency spectrum each are the maximum without need to integrate frequency spectrums or differences thereof.

In addition, the foregoing object can be accomplished by a fading frequency estimating apparatus for obtaining a frequency at which the level of a frequency spectrum is the maximum for each path or a frequency at which the level of a difference in a frequency spectrum is the maximum for each path.

In this fading frequency estimating apparatus, a fading frequency is estimated to be an average value of frequencies at which the levels of frequency spectrums each are the maximum for each path or to be an average value of frequencies at which the levels of differences in all pairs of frequency spectrum each are the maximum for each path.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

First of all, with reference to FIG. 1 to FIG. 4, the theories of fading frequency estimating apparatuses according to the present invention will be described.

Figure 1:
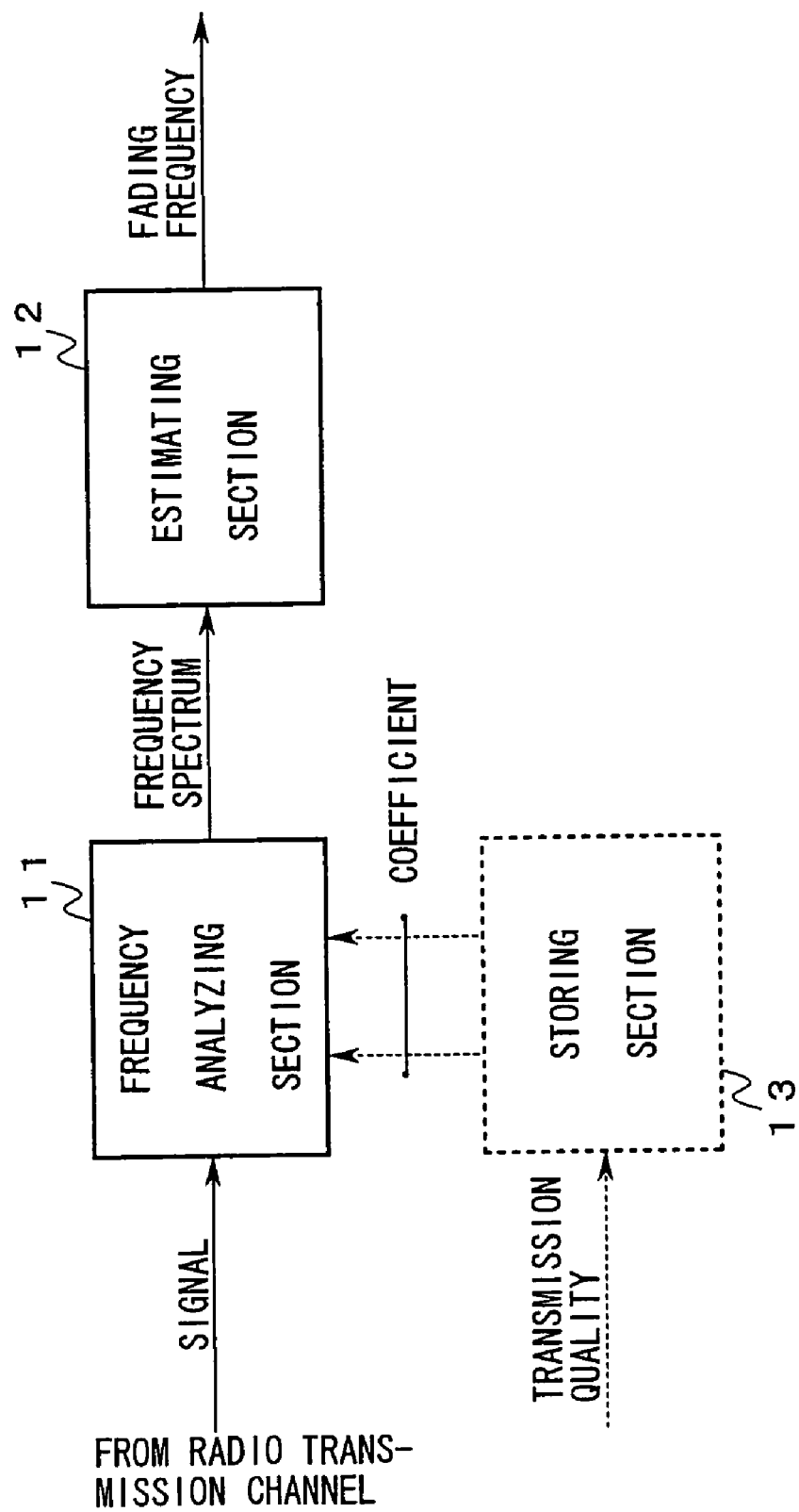
FIG. 1 is a first theoretical block diagram of the present invention.

FIG. 1 is a first theoretical block diagram of the present invention.

A fading frequency estimating apparatus shown in FIG. 1 is composed of a frequency analyzing section 11, an estimating section 12, and a storing section 13.

A first fading frequency estimating apparatus of the present invention operates in accordance with the following theory.

The frequency analyzing section 11 obtains a frequency spectrum of a sequence of differences in instantaneous values of envelop components at two instances apart for which a characteristic of a radio transmission channel is considered to be steady from components of a signal that chronologically arrives through the radio transmission channel. The estimating section 12 estimates a frequency of fading that occurs on the radio transmission channel to be a frequency at which the level of the frequency spectrum is the maximum.

This fading frequency estimating apparatus can obtain a foregoing frequency spectrum without necessity of most of components of steady amplitudes of a signal that arrives on the radio transmission channel. The frequency spectrum has the maximum value that is steep at the fading frequency of the fading that occurs on the radio transmission channel.

Thus, even if the number of differences in instantaneous values referenced to obtain the frequency spectrum is smaller than the case that the frequency spectrum contains components of steady amplitudes of the signal, a fading frequency can be accurately estimated.

Figure 2:
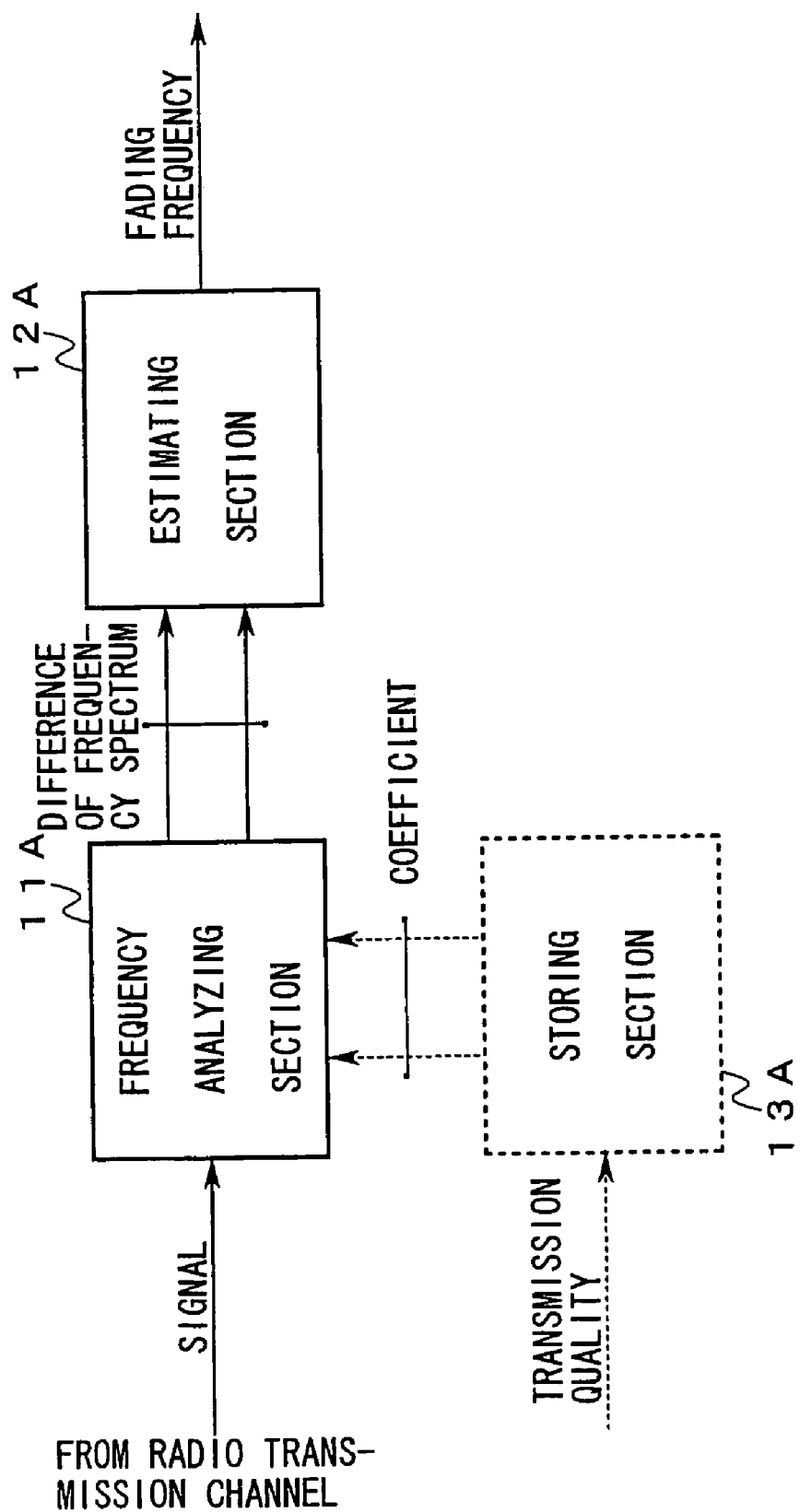
FIG. 2 is a second theoretical block diagram of the present invention.

FIG. 2 is a second theoretical block diagram of the present invention.

A fading frequency estimating apparatus shown in FIG. 2 is composed of a frequency analyzing section 11A, an estimating section 12A, and a storing section 13A.

A second fading frequency estimating apparatus according to the present invention operates in accordance with the following theory.

The frequency analyzing section 11A obtains frequency spectrums of signals that chronologically arrive through a radio transmission channel in two periods apart for which a characteristic of the radio transmission channel is considered to be steady at both a start point and an end point or either thereof on the time axis. The estimating section 12A estimates a frequency of fading that occurs on the radio transmission channel to be a frequency at which the difference in the frequency spectrums is the maximum.

In this fading frequency estimating apparatus, the foregoing frequency spectrums are mathematically equivalent to the frequency spectrums obtained by the frequency analyzing section 11 of the first fading frequency estimating apparatus.

Thus, even if the number of instantaneous values referenced to obtain the frequency spectrums is smaller than the case that the frequency spectrums contain components of steady amplitudes of the signals, a fading frequency can be accurately estimated.

Figure 3:
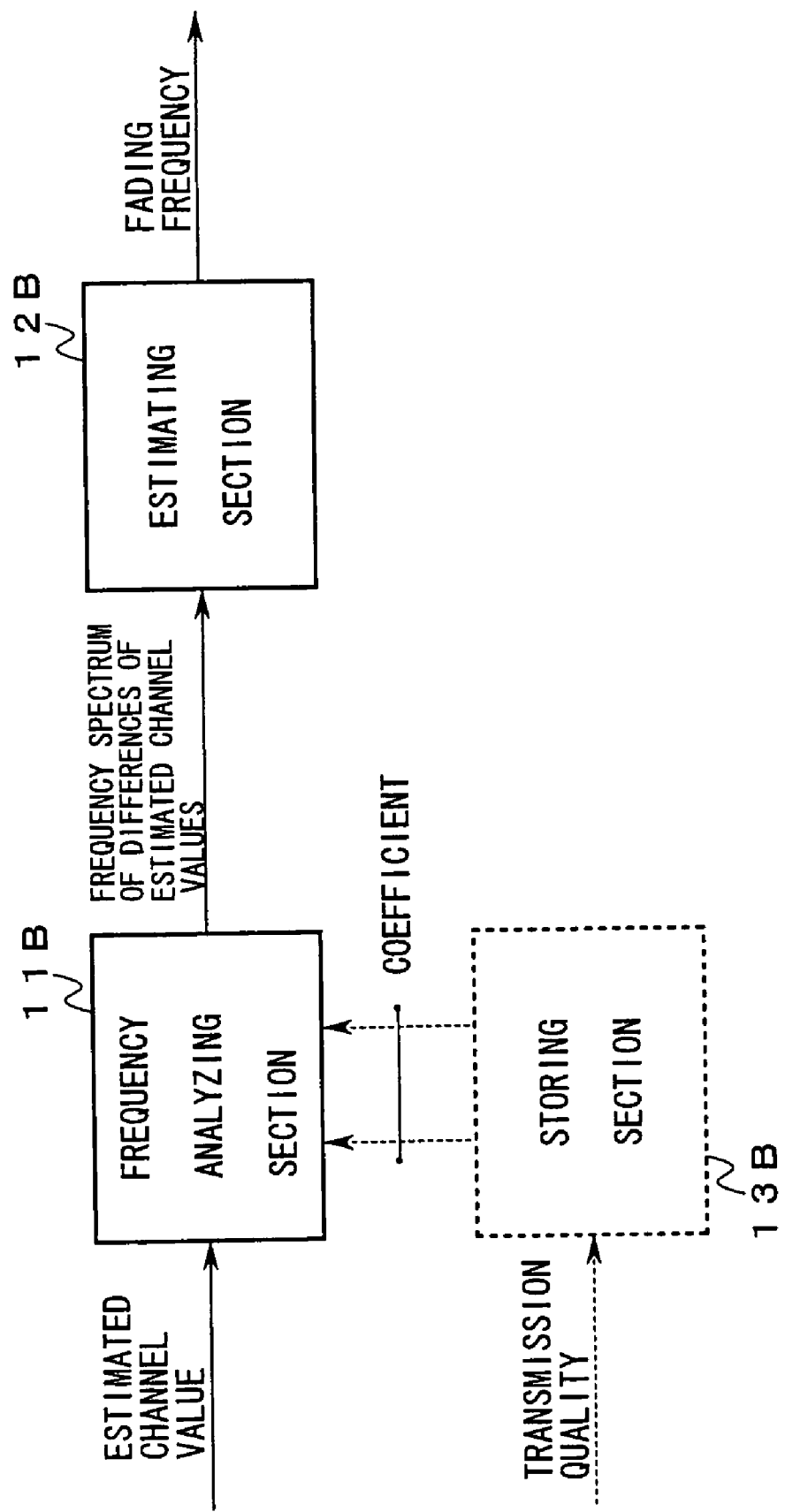
FIG. 3 is a third theoretical block diagram of the present invention.

FIG. 3 is a third theoretical block diagram of the present invention.

A fading frequency estimating apparatus shown in FIG. 3 is composed of a frequency analyzing section 11B, an estimating section 12B, and a storing section 13B.

A third fading frequency estimating apparatus according to the present invention operates in accordance with the following theory.

The frequency analyzing section 11B obtains a frequency spectrum of a sequence of differences in chronologically estimated channel values of a radio transmission channel at two instances apart for which a characteristic of the radio transmission channel is considered to be steady. The estimating section 12B estimates a frequency of fading that occurs on the foregoing radio transmission channel to be a frequency at which the level of the frequency spectrum is the maximum.

In this fading frequency estimating apparatus, the difference in estimated channel values contained in the sequence of the differences in the estimated channel values is considered to be equal to the difference in the amplitudes of the first fading frequency estimating apparatus because the estimated channel values represent a transmission characteristic of a radio transmission channel through which signals are transmitted as long as the level of transmission waves equivalent to these signals is constant or known.

In addition, the possibility of which these estimated channel values are obtained by the existing hardware of the receiving system according to the present invention is high.

Thus, the existing hardware can be effectively used. In addition, a fading frequency can be inexpensively, accurately, and effectively estimated.

Figure 4:
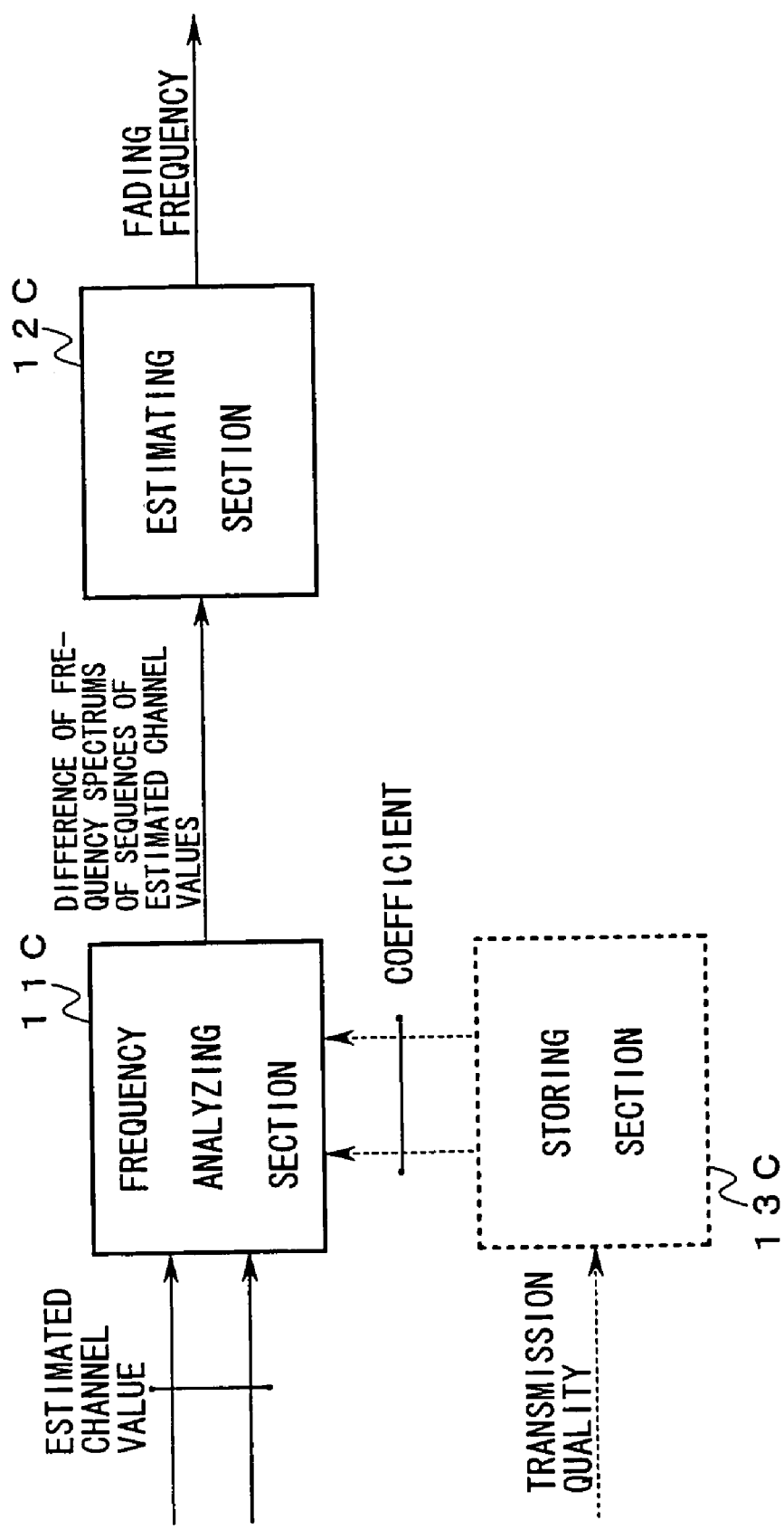
FIG. 4 is a fourth theoretical block diagram of the present invention.

FIG. 4 is a fourth theoretical block diagram of the present invention.

A fading frequency estimating apparatus shown in FIG. 4 is composed of a frequency analyzing section 11C, an estimating section 12C, and a storing section 13C.

A fourth fading frequency estimating apparatus according to the present invention operates in accordance with the following theory.

The frequency analyzing section 11C obtains the difference in frequency spectrums of sequences of chronologically estimated channel values of a radio transmission channel in two periods on the time axis, at both a start point and an end point or either thereof of each of the two periods a characteristic of the radio transmission channel is considered to be steady. The estimating section 12C estimates a frequency of fading that occurs on the radio transmission channel to be a frequency at which the difference in the frequency spectrums is the maximum.

In this fading frequency estimating apparatus, the frequency spectrums are mathematically equivalent to the frequency spectrums obtained by the frequency analyzing section 11B of the third fading frequency estimating apparatus.

Thus, as with the third fading frequency estimating apparatus, the existing hardware can be effectively used. In addition, a fading frequency can be inexpensively, accurately, and effectively estimated.

A fifth fading frequency estimating apparatus according to the present invention operates in accordance with the following theory.

The frequency analyzing section 11B obtains a frequency spectrum of sequences of differences in estimated channel values for each path that forms the radio transmission channel. In addition, the frequency analyzing section 11B obtains the sum of the frequency spectrums as a frequency spectrum of a sequence of differences in estimated channel values of the radio transmission channel.

In this fading frequency estimating apparatus, an estimated value of a fading frequency is obtained as a frequency at which the power is the maximum in the sum of the frequency spectrums of signals that arrive through major paths of a multipath environment of a radio transmission channel is the maximum.

Thus, according to the present invention, a fading frequency can be more accurately estimated than the case that a fading frequency is estimated in accordance with a signal that arrives through a single path.

A sixth fading frequency estimating apparatus according to the present invention operates in accordance with the following theory.

The frequency analyzing section 11C obtains the difference in frequency spectrums of sequences of estimated channel values for each path that forms the radio transmission channel. In addition, the frequency analyzing section 11C obtains the sum of the frequency spectrums as the difference in frequency spectrums of sequences of estimated channel values of the radio transmission channel.

In this fading frequency estimating apparatus, the frequency spectrums are mathematically equivalent to the frequency spectrums obtained by the frequency analyzing section 11C of the fifth fading frequency estimating apparatus.

Thus, as with the fifth fading frequency estimating apparatus, the accuracy of an estimated value of a fading frequency can be improved.

A seventh fading frequency estimating apparatus according to the present invention operates in accordance with the following theory.

The frequency analyzing section 11 is pre-assigned two coefficients with which a frequency spectrum is to be steep at a frequency of which the level of the frequency spectrum becomes the maximum. The frequency analyzing section 11 obtains a frequency spectrum of sequences of differences in instantaneous values as the sum of products of these coefficients and envelop components at two instances.

In the fading frequency estimating apparatus, a frequency spectrum is obtained in the following two modes in accordance with the two coefficients without excessive components of steady amplitudes of signals.

In a low band, a variation component superimposed due to fading can be distinguished from noise superimposed due to a factor other than fading in accordance with the maximum value of the power.

In a high band, the difficulty for determining whether noise superimposed onto an envelop component is caused by fading can be alleviated.

Thus, as long as the foregoing two coefficients are pre-assigned as proper values, even if the transmission quality largely varies, a fading frequency can be more accurately and stably estimated than the case that a frequency spectrum is obtained by performing the Fourier Transform for a sequence of differences in instantaneous values of envelop components at different instances.

An eighth fading frequency estimating apparatus according to the present invention operates in accordance with the following theory.

The frequency analyzing section 11A is pre-assigned two coefficients with which the difference in frequency spectrums is to be steep at a frequency of which the difference in the frequency spectrums is the maximum. The frequency analyzing section 11A obtains the difference in the frequency spectrums as the sum of products of these coefficients and the frequency spectrums of signals.

In the fading frequency estimating apparatus, the frequency spectrums are mathematically equivalent to the frequency spectrums obtained by the frequency analyzing section 11 of the seventh fading frequency estimating apparatus.

Thus, as long as the foregoing two coefficients are pre-assigned as proper values, even if the transmission quality largely varies, a fading frequency can be more accurately and stably estimated than the case that a frequency spectrum is obtained by performing the Fourier Transform for a sequence of differences in instantaneous values of envelop components at different instances.

A ninth fading frequency estimating apparatus according to the present invention operates in accordance with the following theory.

The frequency analyzing section 11B is pre-assigned two coefficients with which a frequency spectrum is to be steep at a frequency of which the level of the frequency spectrum is the maximum. The frequency analyzing section 11B obtains a frequency spectrum of a sequence of differences in instantaneous values as the sum of products of these coefficients and estimated channel values at two instances.

In the fading frequency estimating apparatus, a frequency spectrum is obtained in the following two modes in accordance with the two coefficients without excessive components of steady amplitudes of signals.

In a low band, a variation component superimposed due to fading can be distinguished from noise superimposed due to a factor other than fading in accordance with the maximum value of the power.

In a high band, the difficulty for determining whether noise superimposed onto an envelop component is caused by fading can be alleviated.

Thus, as long as these two coefficients are pre-assigned as proper values, even if the transmission quality largely varies, a fading frequency can be more accurately and stably estimated than the case that a frequency spectrum is obtained by performing the Fourier Transform for a sequence of differences in instantaneous values of envelop components at different instances.

A tenth fading frequency estimating apparatus according to the present invention operates in accordance with the following theory.

The frequency analyzing section 11C is pre-assigned two coefficients with which the difference in frequency spectrums is to be steep at a frequency of which the difference in the frequency spectrums is the maximum. The frequency analyzing section 11C obtains the difference as the sum of products of these coefficients and frequency spectrums of sequences of discretely estimated channel values of a radio transmission channel in different periods.

In the fading frequency estimating apparatus, the frequency spectrums are mathematically equivalent to the frequency spectrums obtained by the frequency analyzing section 11B of the ninth fading frequency estimating apparatus.

Thus, as long as these two coefficients are pre-assigned as proper values, even if the transmission quality largely varies, a fading frequency can be more accurately and stably estimated than the case that a frequency spectrum is obtained by performing the Fourier Transform for a sequence of differences in instantaneous values of envelop components at different instances.

An eleventh fading frequency estimating apparatus according to the present invention operates in accordance with the following theory.

The storing section 13 pre-stores two coefficients with which a frequency spectrum is to be steep in accordance with the transmission quality of a radio transmission channel at a frequency of which the level of the frequency spectrum is the maximum. The frequency analyzing section 11 obtains a frequency spectrum of a sequence of differences in instantaneous values as the sum of products of the two coefficients pre-stored in the storing section 13 in accordance with the transmission quality and envelop components at two instances.

In this fading frequency estimating apparatus, a frequency spectrum is accurately obtained in the following two modes even if suitable values of the two coefficients vary as the transmission quality varies.

In a low band, a variation component superimposed due to fading can be distinguished from noise superimposed due to a factor other than fading in accordance with the maximum value of the power.

In a high band, the difficulty for determining whether noise superimposed onto an envelop component is caused by fading can be alleviated.

Thus, as long as these two coefficients are pre-stored as suitable values in the storing section 13 in accordance with the transmission quality, even if the transmission quality largely varies, a fading frequency can be accurately and stably estimated.

A twelfth fading frequency estimating apparatus according to the present invention operates in accordance with the following theory.

The storing section 13A pre-stores two coefficients with which the difference in frequency spectrums is to be steep in accordance with the transmission quality of a radio transmission channel at a frequency of which the difference is the maximum. The frequency analyzing section 11A obtains the difference as the sum of products of the two coefficients pre-stored in the storing section 13 in accordance with the transmission quality and frequency spectrums of signals.

In this fading frequency estimating apparatus, the frequency spectrums are mathematically equivalent to the frequency spectrums obtained by the frequency analyzing section 11 of the eleventh fading frequency estimating apparatus.

Thus, as long as these two coefficients are pre-stored as suitable values in the storing section 13A in accordance with the transmission quality, even if the transmission quality largely varies, a fading frequency can be accurately and stably estimated.

A thirteenth fading frequency estimating apparatus according to the present invention operates in accordance with the following theory.

The storing section 13B pre-stores two coefficients with which a frequency spectrum is to be steep in accordance with the transmission quality of a radio transmission channel at a frequency of which the level of the frequency spectrum is the maximum. The frequency analyzing section 11B obtains a frequency spectrum of a sequence of differences in instantaneous values as the sum of products of the two coefficients pre-stored in the storing section 13B in accordance with the transmission quality and estimated channel values estimated at two instances.

In the fading frequency estimating apparatus, a frequency spectrum is accurately obtained in the following two modes even if suitable values of the two coefficients vary as the transmission quality varies.

In a low band, a variation component superimposed due to fading can be distinguished from noise superimposed due to a factor other than fading in accordance with the maximum value of the power.

In a high band, the difficulty for determining whether noise superimposed onto an envelop component is caused by fading can be alleviated.

Thus, as long as these two coefficients are pre-stored as suitable values in the storing section 13B in accordance with the transmission quality, even if the transmission quality largely varies, a fading frequency can be accurately and stably estimated.

A fourteenth fading frequency estimating apparatus according to the present invention operates in accordance with the following theory.

The storing section 13C pre-stores two coefficients with which the difference in frequency spectrums is to be steep in accordance with the transmission quality of a radio transmission channel at a frequency of which the difference is the maximum. The frequency analyzing section 11C obtains the difference as the sum of products of the two coefficients pre-stored in the storing section 13C in accordance with the transmission quality and frequency spectrums of sequences of discretely estimated channel values of the radio transmission channel in two periods.

In the fading frequency estimating apparatus, the frequency spectrums are mathematically equivalent to the frequency spectrums obtained by the frequency analyzing section 11A of the thirteenth fading frequency estimating apparatus.

Thus, as long as these coefficients are pre-stored as suitable values in the storing section 13C in accordance with the transmission quality, even if the transmission quality largely varies, a fading frequency can be accurately and stably estimated.

A fifteenth fading frequency estimating apparatus according to the present invention operates in accordance with the following theory.

The estimating section 12 estimates a frequency of fading that occurs on a radio transmission channel to be a frequency at which the level is the maximum in a frequency band of which a change rate of the frequency spectrum is the maximum.

In the fading frequency estimating apparatus, a frequency that is closest to a frequency band in which a change rate of a frequency spectrum is the maximum on the frequency axis and at which the power of the frequency spectrum is the maximum is estimated to be a fading frequency.

Thus, even if an interference wave or disturbance wave having a large level is superimposed, as with fading that occurs on a radio transmission channel and in a multipath environment in which a transmission characteristic is stable, a fading frequency of fading that concentrates in a narrow band can be accurately estimated.

A sixteenth fading frequency estimating apparatus according to the present invention operates in accordance with the following theory.

The estimating section 12A estimates a frequency of fading that occurs on a radio transmission channel to be a frequency at which the power of a frequency spectrum is the maximum in a frequency band of which a change rate of a difference in the frequency spectrum is the maximum.

In the fading frequency estimating apparatus, a frequency that is closest to a frequency band in which a change rate is the maximum on the frequency axis and at which the power of the frequency spectrum is the maximum is estimated to be a fading frequency.

Thus, even if an interference wave or disturbance wave having a large level is superimposed, a fading frequency of fading that concentrates in a narrow band can be accurately estimated.

A seventeenth fading frequency estimating apparatus according to the present invention operates in accordance with the following theory.

The estimating section 12B estimates a frequency of fading that occurs on a radio transmission channel to be a frequency at which the power is the maximum in a frequency band of which a change rate of a frequency spectrum is the maximum.

In the fading frequency estimating apparatus, a frequency that is closest to a frequency band in which a change rate of a frequency spectrum is the maximum on the frequency axis and at which the power of the frequency spectrum is the maximum is estimated to be a fading frequency.

Thus, even if an interference wave or disturbance wave having a large level is superimposed, as with fading that occurs on a radio transmission channel and in a multipath environment of which a transmission characteristic is stable, a fading frequency of fading that concentrates in a narrow band can be accurately estimated.

An eighteenth fading frequency estimating apparatus according to the present invention operates in accordance with the following theory.

The estimating section 12C estimates a frequency of fading that occurs on a radio transmission channel to be a frequency at which the level is the maximum in a frequency band of which a change rate of a difference in a frequency spectrum is the maximum.

In the fading frequency estimating apparatus, a frequency that is closest to a frequency band of which a change rate is the maximum on the frequency axis and at which the power of the frequency spectrum is the maximum is estimated to be a fading frequency.

Thus, even if an interference wave or disturbance wave having a large level is superimposed, a fading frequency of fading that concentrates in a narrow band can be accurately estimated.

Nineteenth to twenty-second fading frequency estimating apparatuses according to the present invention operate in accordance with the following theory.

The frequency analyzing section 11, 11A, 11B, and 11C each integrate a plurality of pre-obtained frequency spectrums so as to obtain the latest frequency spectrum.

In these fading frequency estimating apparatuses, an error component contained in each pre-obtained frequency spectrum is suppressed.

Thus, as long as increases of process amount, storage capacity, and other resources and deterioration of response can be traded off against the latest frequency spectrum, the accuracy of an estimated value of a fading frequency can be improved.

Twenty-third to twenty-sixth fading frequency estimating apparatuses according to the present invention operate in accordance with the following theory.

The frequency analyzing section 11, 11A, 11B, and 11C each chronologically and repeatedly obtain frequency spectrums. The estimating section 12, 12A, 12B, and 12C each estimate a fading frequency to be an average value of frequencies at which the levels of a plurality of frequency spectrums each are the maximum or an average value of frequencies at which the levels of differences in all pairs of a plurality of frequency spectrums each are the maximum.

In other words, a fading frequency can be estimated to be an average value of frequencies at which the levels of frequency spectrums each are the maximum or to be an average value of frequencies at which the levels of differences in all pairs of frequency spectrum each are the maximum without need to integrate frequency spectrums or differences thereof.

Thus, even if objects for individual frequency spectrums are not sufficiently steady or these frequency spectrums are not sufficiently accurate on the frequency axis, a fading frequency can be accurately estimated.

Twenty-seventh and twenty-eighth fading frequency estimating apparatuses according to the present invention operate in accordance with the following theory.

The frequency analyzing section 11B and 11C each chronologically and repeatedly obtain frequency spectrums for each path that forms a radio transmission channel. The estimating section 12B and 12C each estimate a fading frequency for each path to be an average value of frequencies at which the levels of a plurality of frequency spectrums each are the maximum or an average value of frequencies at which the levels of differences in all pairs of a plurality of frequency spectrums each are the maximum.

In other words, a fading frequency for each path is estimated to be an average value of frequencies at which the levels of frequency spectrums each are the maximum or to be an average value of frequencies at which the levels of differences in all pairs of frequency spectrums each are the maximum.

Thus, even if transmission characteristics of individual paths that form a radio transmission channel are not always highly correlated, a fading frequency for each path can be accurately estimated.

Next, with reference to the accompanying drawings, embodiments of the present invention will be described.

First Embodiment

Figure 5:
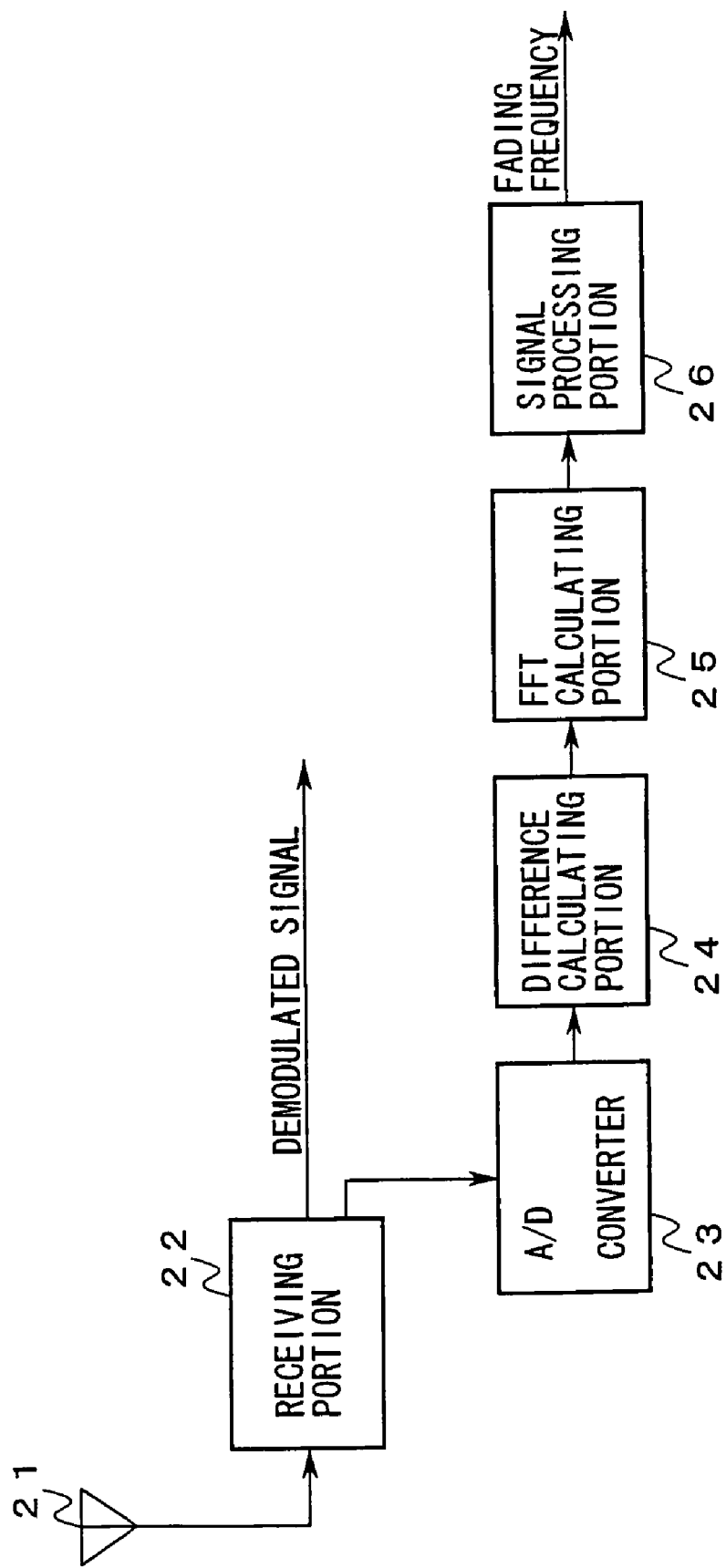
FIG. 5 is a schematic diagram showing a first embodiment and a third embodiment of the present invention.

FIG. 5 is a schematic diagram showing first and third embodiments of the present invention.

In the drawing, a feeding point of an antenna 21 is connected to an input of a receiving portion 22. A demodulated signal is obtained from one output of the receiving portion 22. Another output of the receiving portion 22 is connected to an input of a signal processing portion 26 through an A/D converter 23, a difference calculating portion 24, and an FFT calculating portion 25 that are cascade-connected. A fading frequency is obtained from an output of the signal processing portion 26.

Figure 6A:
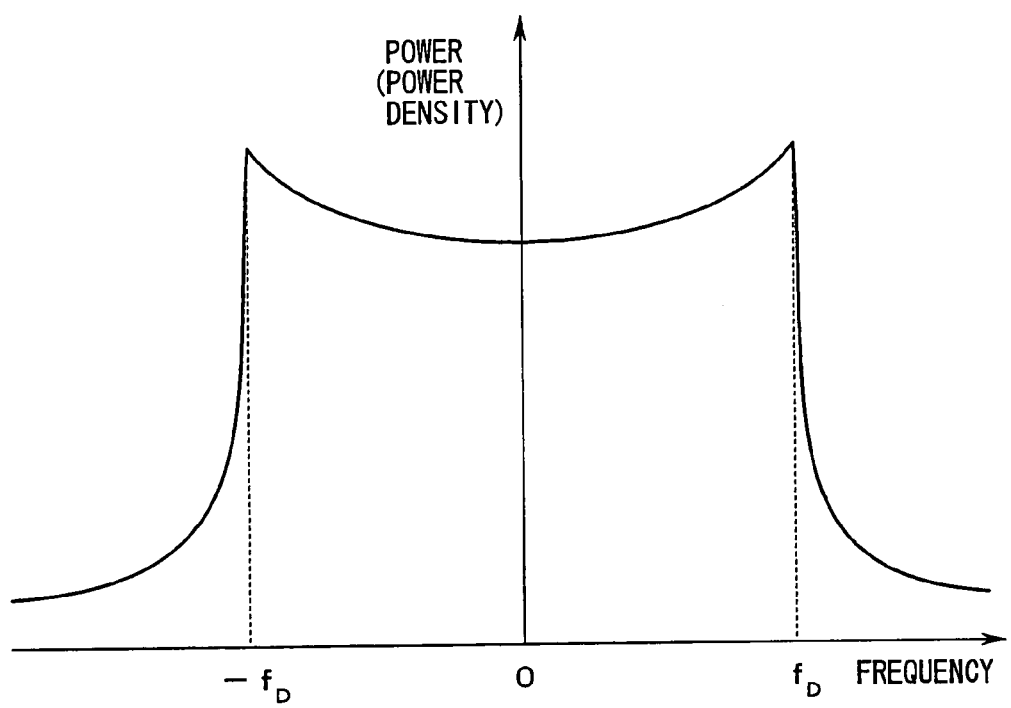
FIG. 6A and FIG. 6B are graphs describing an operation of the first embodiment of the present invention.
Figure 6B:
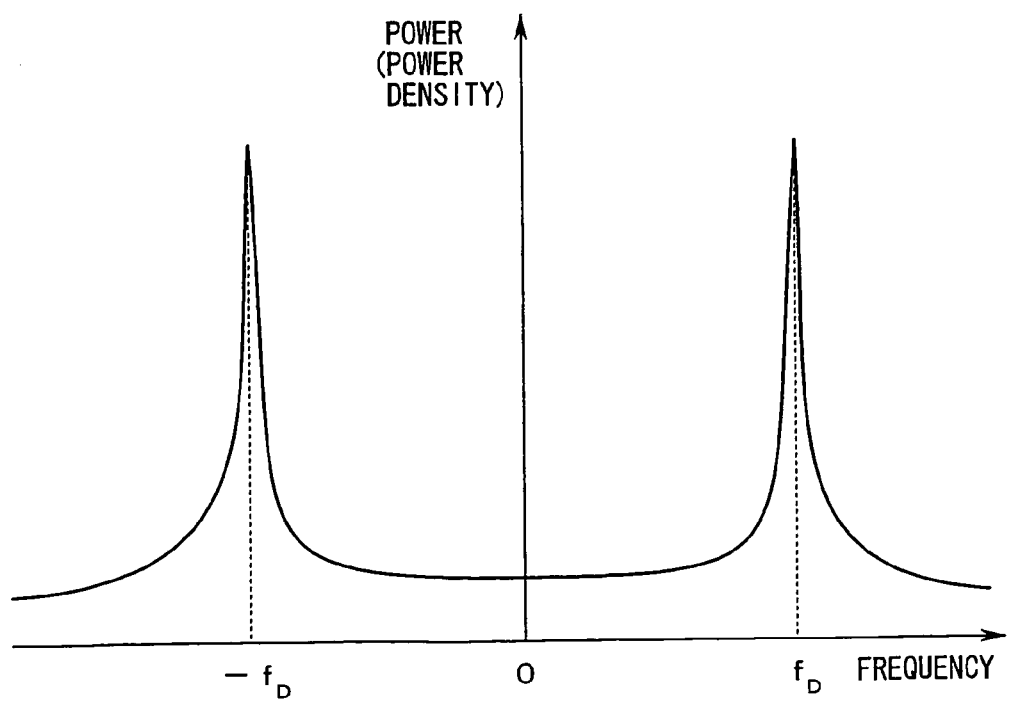

FIG. 6A and FIG. 6B are schematic diagrams describing an operation of the first embodiment. Next, with reference to FIG. 5 and FIGS. 6A and 6B, the operation of the first embodiment will be described.

The receiving portion 22 heterodyne-detects (homodyne-detects) a received wave that arrives at the antenna 21 through a particular radio channel formed in accordance with the CDMA system and multiplies the received wave by a spreading code that corresponds to the radio channel. As a result, the receiving portion 22 generates a base band signal that represents the received wave in a base band region.

The A/D converter 23 samples the base band signal at a sampling frequency fs that satisfies a sampling theorem in an occupied band of the base band signal. As a result, the A/D converter 23 generates a discrete signal that chronologically discretizes a sequence of amplitudes of the base band signal.

The difference calculating portion 24 simultaneously captures sequences of amplitudes of two windows that satisfy all conditions that follow (these conditions are referred to as window conditions) and that are different on the time axis. As a result, the difference calculating portion 24 generates a sequence $\Delta$ of differences in all pairs of amplitudes of the two sequences (for simplicity, denoted by "$A_{1i}$" and "$A_{2i}$," in a time sequence i).

A period W is equal to the product of a predetermined odd integer N and a sampling period Ts equal to the reciprocal of the sampling frequency fs. In addition, the period W is so short that a statistical characteristic of fading that may be involved in the received wave (a transmission characteristic of the predetermined radio channel) can be considered to be steady.

An interval $\tau$ on the time axis is equal to an integer multiple of the sampling period Ts. In addition, the interval $\tau$ is so short that the statistic characteristic can be considered to be steady.

By performing the Fast Fourier Transform for the sequence $\Delta$ of the differences, the FFT calculating portion 25 obtains a frequency spectrum of the sequence of the differences.

The signal processing portion 26 determines a frequency slot whose power is the maximum in frequency slots of the frequency spectrum and obtains a frequency fd that is a middle point between the maximum frequency and the minimum frequency of the determined frequency slot on the frequency axis.

As long as the distributions of the amplitudes of the received wave in the two widows are considered to be steady and common, as shown in FIG. 6B, the frequency spectrum does not contain most of components of steady (ideal) amplitudes that do not involve fading in components of amplitudes of the received wave (a frequency at 0 Hz and their upper and lower side bands) shown in FIG. 6A).

Thus, the frequency fd corresponds to a fading frequency that represents the highest count of which an amplitude of a received wave actually varies due to fading that occurs on a particular radio channel.

In other words, when components of steady (ideal) amplitudes of a received wave are securely excluded for the Fast Fourier Transform, a fading frequency can be obtained as a frequency at which the level of the frequency spectrum is steep and the maximum.

According to this embodiment, even if the width of a window in which the Fast Fourier Transform is performed (the number N of differences contained in the sequence $\Delta$ of differences) is small, a fading frequency can be more accurately estimated than the case that components of steady (ideal) amplitudes of the received wave are not excluded for the Fast Fourier Transform. Alternatively, the width of a window with which a fading frequency can be estimated with desired accuracy can be decreased.

According to this embodiment, the two windows are set in different periods that do not overlap on the time axis.

However, as long as the foregoing conditions are satisfied for the two windows, when the two windows partly overlap on the time axis, the load of the difference calculating portion 24 can be decreased.

In addition, according to this embodiment, the interval $\tau$ of the two windows on the time axis is set for a value equal to an integer multiple of the sampling period Ts.

However, when the A/D converter 23 simultaneously performs A/D conversion for these windows, the interval $\tau$ may be set for a small value of which a statistic characteristic of fading (a transmission characteristic of a particular radio channel) that may be involved in a received wave can be considered to be steady.

In addition, according to this embodiment, the start point and end point of each of the two windows are decided without any synchronization with a received wave.

However, when both the start point and end point or either thereof is set in synchronization with each symbol of the modulating system in accordance with the received wave, an error of which the two windows do not synchronize with the received wave can be decreased.

Second Embodiment

Figure 7:
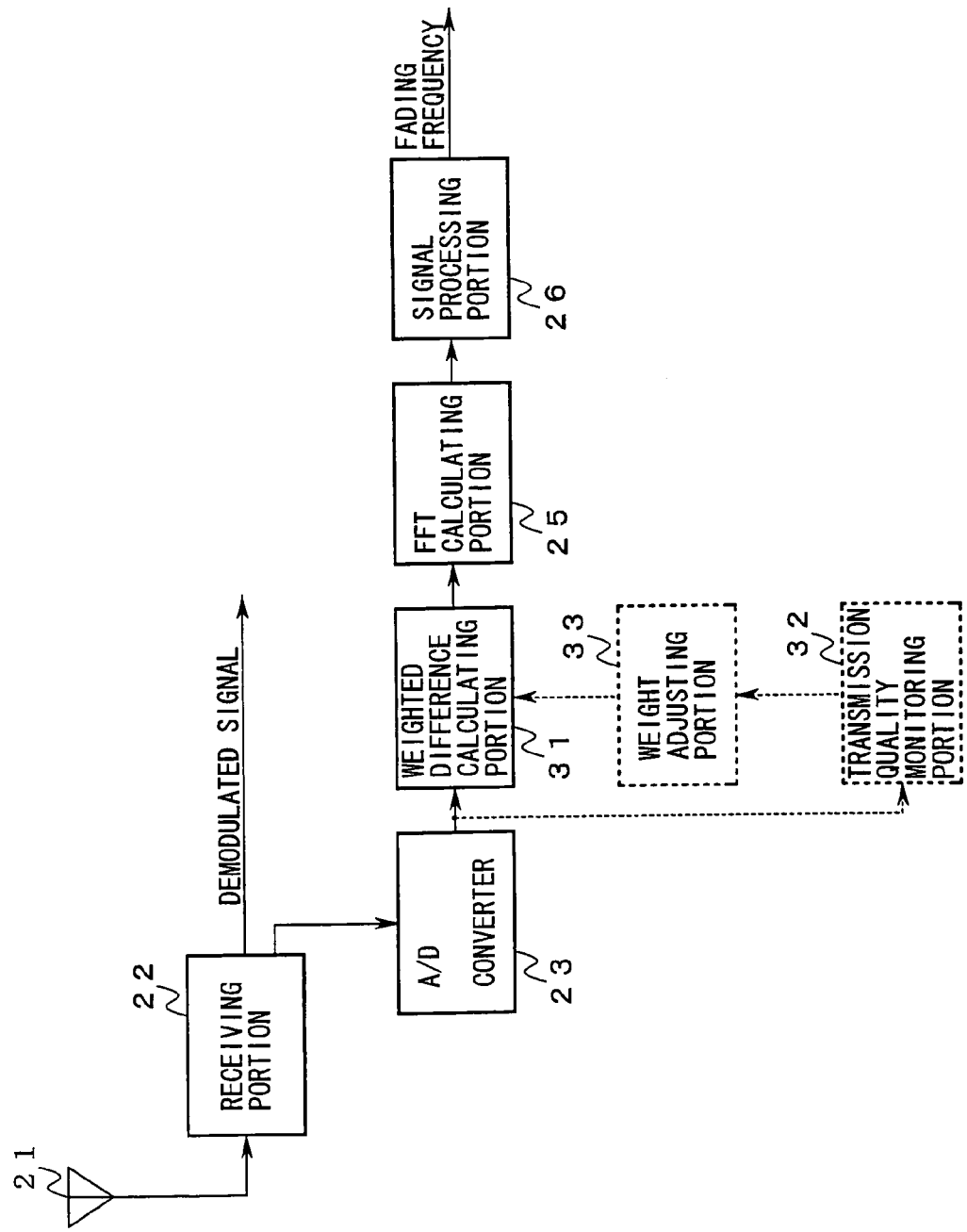
FIG. 7 is a schematic diagram showing a second embodiment of the present invention.

FIG. 7 is a schematic diagram showing a second embodiment of the present invention.

According to this embodiment, a weighted difference calculating portion 31 is disposed instead of the difference calculating portion 24.

Next, with reference to FIG. 7, an operation of the second embodiment of the present invention will be described.

This embodiment has a feature of which the weighted difference calculating portion 31 performs the following process to obtain a sequence $\Delta$ of differences.

Like the first embodiment, the weighted difference calculating portion 31 simultaneously captures two sequences "$A_{1i}$" and "$A_{2i}$" of amplitudes of two windows that satisfy all the window conditions and that differ on the time axis.

According to the first embodiment, in a low band of a frequency spectrum of which the Fast Fourier Transform is performed for the sequence Δ of differences, it is difficult to distinguish a variation component of an amplitude superimposed onto the sequence Δ of differences due to fading from noise superimposed thereonto because they have correlation themselves.

In addition, in frequency spectrums of which the Fast Fourier Transform is discretely performed for the two sequences $A_{1i}$ and $A_{2i}$ of amplitudes, differences are not obtained before the Fast Fourier Transform is performed. Thus, it becomes more difficult to determine whether noise superimposed onto sequences $A_{1i}$ and $A_{2i}$ of amplitudes is caused by fading as the frequency band becomes higher.

The weighted difference calculating portion 31 is pre-assigned two weights $w_1(0 \leq w_1 < 1)$ and $w_2(-1 \leq w_2 < 0)$ that are selected in accordance with these frequency spectrums and that satisfy the following conditions.

Since a frequency at which the power is the maximum in a frequency spectrum obtained by the FFT calculating portion 25 accurately matches an estimated value of a fading frequency, the low band and high band are properly weighted.

As the transmission quality (SN ratio) of a received wave is higher, the absolute value of each weight is closer to 1.

In addition, the weighted difference calculating portion 31 obtains the sequence Δ of differences as the sum of products of the weights $w_1$ and $w_2$ and the sequences $A_{1i}$ and $A_{2i}$ of amplitudes as expressed by the following formula.

$$\Delta = w_1 \cdot A_{1i} + w_2 \cdot A_{2i}$$

In other words, both the high band and low band of a frequency spectrum obtained by the FFT calculating portion 25 are properly weighted in accordance with the weights $w_1$ and $w_2$.

Thus, according to the embodiment, a fading frequency can be more accurately and stably estimated even if the transmission quality largely varies than the first embodiment of which the sequence Δ of differences is obtained as two sequences of differences in amplitudes.

According to this embodiment, the weights $w_1$ and $w_2$ are pre-assigned as known values.

However, according to this embodiment, when the following blocks denoted by dotted lines shown in FIG. 7 are additionally disposed, a fading frequency can be accurately estimated even if the transmission quality (SN ratio) of a received wave largely varies.

A transmission quality monitoring portion 32 that monitors the transmission quality of a discrete signal obtained by the A/D converter 23 (in accordance with an error of a signal point obtained for each symbol in a signal space, a bit error detected in a decoding process for a transmission signal, or any other information).

A weight adjusting portion 33 that pre-stores suitable weights $w_1$ and $w_2$ measured for various values in accordance with the transmission quality, verified in accordance with a simulation, or theoretically obtained supplies weights corresponding to the transmission quality monitored by the transmission quality monitoring portion 32 to the weighted difference calculating portion 31.

Third Embodiment

Next, with reference to FIG. 5, an operation of a third embodiment of the present invention will be described.

This embodiment has a feature of which the signal processing portion 26 performs the following process.

The signal processing portion 26 determines a frequency slot whose power is larger than any other adjacent frequency slots of a frequency spectrum obtained by the FFT calculating portion 25 and whose relative value is the maximum in powers of these adjacent frequency slots instead of the foregoing frequency slot.

In addition, the signal processing portion 26 estimates a frequency fd at a center point between the highest frequency and the lowest frequency of the determined frequency slot on the frequency axis to be a fading frequency.

In other words, the center frequency of the frequency slot that is closest to a band of which a power change rate is the maximum on the frequency axis and whose power is the maximum is estimated to be a fading frequency.

Thus, even if an interference wave or disturbance wave having a large level is superimposed onto a received wave, a fading frequency of fading that concentrates in a narrow band such as fading that occurs due to a stationary substance on a radio transmission channel can be accurately estimated.

Fourth Embodiment

Figure 8:
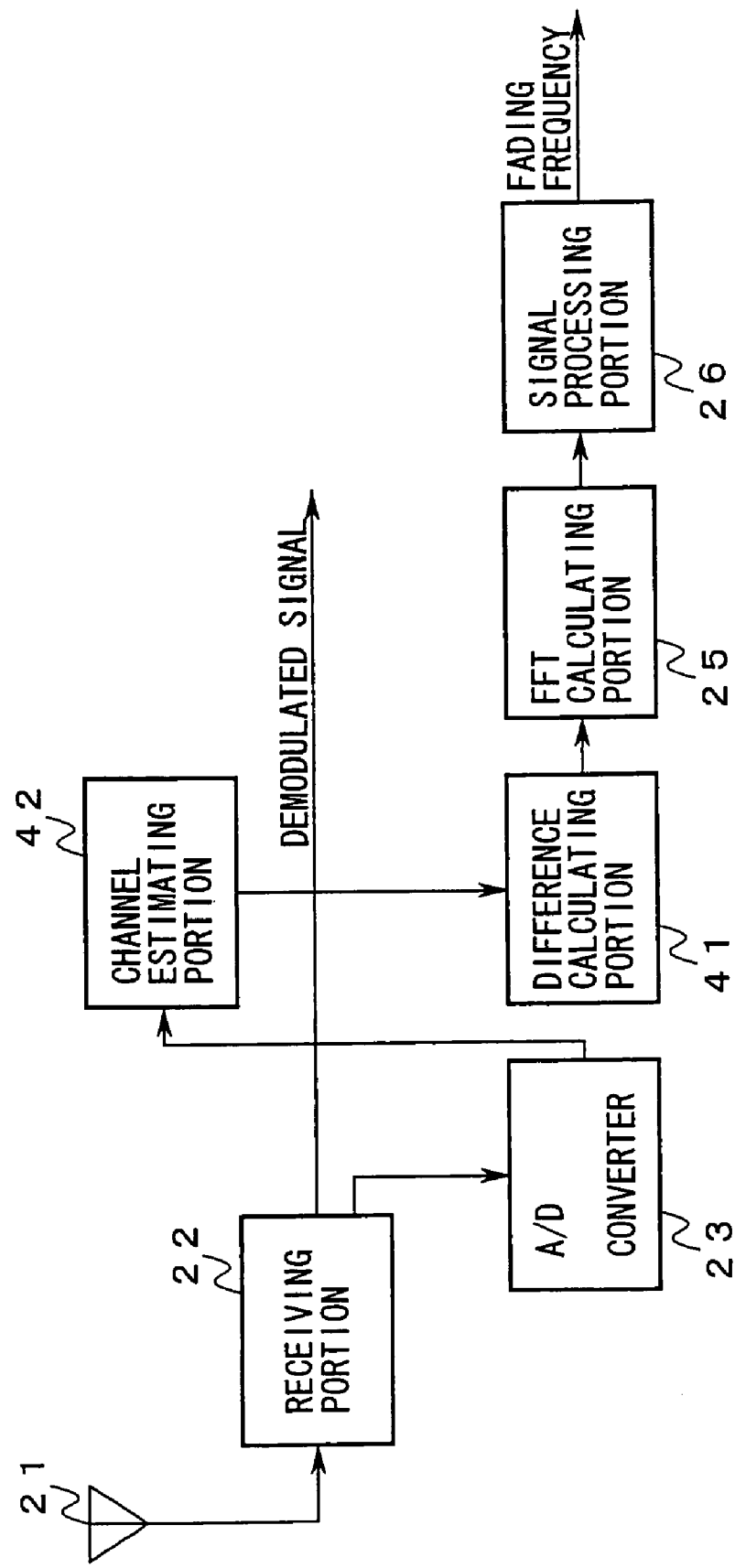
FIG. 8 is a schematic diagram showing a forth embodiment of the present invention.

FIG. 8 is a schematic diagram showing a fourth embodiment of the present invention.

According to this embodiment, a difference calculating portion 41 is disposed instead of the difference calculating portion 24 shown in FIG. 5. In addition, a channel estimating portion 42 is disposed between the A/D converter 23 and the difference calculating portion 41.

Next, with reference to FIG. 8, an operation of the fourth embodiment of the present invention will be described.

This embodiment has a feature of which the channel estimating portion 42 and the difference calculating portion 41 associatively perform the following process.

A received wave that arrives at an antenna 21 is composed of a sequence of slots that contain a known pilot signal in a predetermined field (a pilot channel).

The channel estimating portion 42 correlates a discrete signal that is generated by the A/D converter 23 and that discretizes the received wave with the pilot signal. As a result, the channel estimating portion 42 chronologically obtains a sequence of estimated channel values that represent a transmission characteristic of a radio transmission channel through which the received wave arrives.

The difference calculating portion 41 simultaneously captures sequences of estimated channel values that satisfy all window conditions and that are of two different windows rather than the foregoing sequences of amplitudes. As a result, the difference calculating portion 41 generates a sequence Δ of differences in all pairs of estimated channel values (for simplicity, denoted by $C_{1i}$ and $C_{2i}$ in a time sequence i).

By performing the Fast Fourier Transform for the sequence Δ of differences, the FFT calculating portion 25 obtains a frequency spectrum of the sequence of differences.

Since the estimated channel values each represent a transmission characteristic of a radio transmission channel through which a received wave arrives, differences in estimated channel values contained in the sequence Δ of differences can be considered to be equal to the differences in amplitudes of the first embodiment as long as the level of a wave that corresponds to the received wave transmitted from a transmitting end is constant and known.

In addition, the possibility of which these estimated channel values are obtained by the existing hardware of the receiving system according to the present invention is high.

Thus, according to the present invention, when the existing hardware is effectively used, a fading frequency can be inexpensively, accurately, and effectively estimated.

This embodiment is accomplished by changing the structure of the first embodiment.

However, the present invention is not limited to such a structure. Instead, the present invention can be applied to not only the second and third embodiments but a fifth embodiment that follows.

In addition, according to this embodiment, the pilot signal referenced to obtain an estimated channel value is concentrated at each slot on the time axis.

However, the present invention is not limited to such a structure. When the above-described field (pilot channel) is composed of a set of small fields of a plurality of slots (that are not always chronologically adjacent slots), the deviation of estimated channel values that are chronologically obtained may be equalized.

Fifth Embodiment

Figure 9:
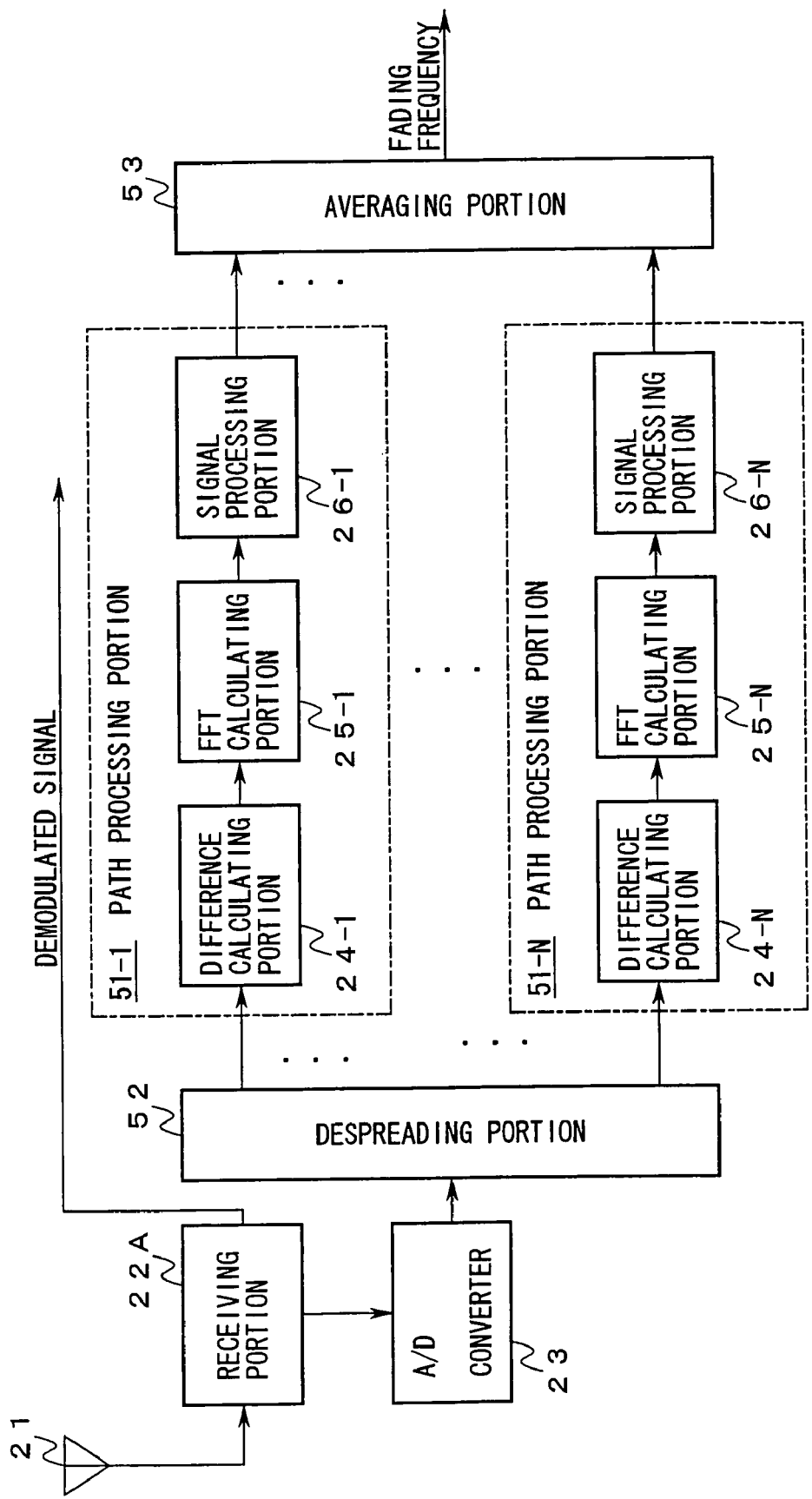
FIG. 9 is a schematic diagram showing a fifth embodiment of the present invention.

FIG. 9 is a schematic diagram showing a fifth embodiment of the present invention.

This embodiment has the following features.

A receiving portion 22A is disposed instead of the receiving portion 22.

A plurality of (N) path processing portions 51-1 to 51-N are disposed instead of the difference calculating portion 24, the FFT calculating portion 25, and the signal processing portion 26 shown in FIG. 5. Each of the path processing portions 51-1 to 51-N is composed of a difference calculating portion, an FFT calculating portion, and a signal processing portion that correspond to the difference calculating portion 24, the FFT calculating portion 25, and the signal processing portion 26, respectively.

A despreading portion 52 is disposed between the A/D converter 23 and the path processing portions 51-1 to 51-N.

An averaging portion 53 is disposed at a stage downstream of the path processing portions 51-1 to 51-N.

Next, with reference to FIG. 9, an operation of the fifth embodiment of the present invention will be described.

The receiving portion 22A Heterodyne-detects (Homodyne-detects) a received wave that arrives at the antenna 21. As a result, the receiving portion 22A generates a base band signal that represents the received wave in the base band region.

The A/D converter 23 samples the base band signal at a sampling frequency fs that satisfies a sampling theory in an occupied band of the base band signal. As a result, the A/D converter 23 generates a discrete signal that chronologically discretizes a sequence of amplitudes of the base band signal.

The despreading portion 52 correlates a spreading code corresponding to a radio channel as a transmission channel of the received wave (in this example, it is assumed that the radio channel is formed in accordance with the CDMA system) with the discrete signal. As a result, the despreading portion 52 simultaneously generates components arrive through major paths in a multipath environment of the transmission channel (signals of such components are referred to as discrete signals).

The path processing portions 51-1 to 51-N each perform the same process as the first embodiment for the discrete signals generated for these paths. As a result, the path processing portions 51-1 to 51-N obtain a plurality N of frequencies fd.

The averaging portion 53 averages these frequencies fd. As a result, the averaging portion 53 obtains an estimated value of a fading frequency.

In other words, an estimated value of a fading frequency is obtained as a moving average value of frequencies fd at which the powers of frequency spectrums of received waves that arrive through major paths in a multipath environment of the radio transmission channel each are the maximum.

Thus, according to this embodiment, a fading frequency can be more accurately obtained than the case that the frequency fd is obtained in accordance with a received wave that arrives through only a single path.

In addition, according to this embodiment, the processes performed by the despreading portion 52, the path processing portions 51-1 to 51-N, and the averaging portion 53 are accomplished as digital signal processes.

Thus, when a digital signal processor (DSP) that performs the processes of the first to fourth embodiments can afford to perform them in real time or with very quick response, the accuracy of an estimated value of a fading frequency can be improved without need to complicate the structure of hardware.

In addition, according to this embodiment, the averaging portion 53 obtains an estimated value of a fading frequency as the moving average value of the frequencies fd obtained for the individual paths.

Alternatively, such a smoothing method may be performed by another algorithm such as an exponential smoothing method other than a smoothing method based on the moving average.

In the foregoing embodiments, the sampling frequency fs, the number n of amplitude values calculated by the Fast Fourier Transform, the number of major paths, the number of significant digits (word length) of arithmetic calculations performed by each portion, weights $w_1$ and $w_2$, and other parameters are assigned as constants.

Figure 10:
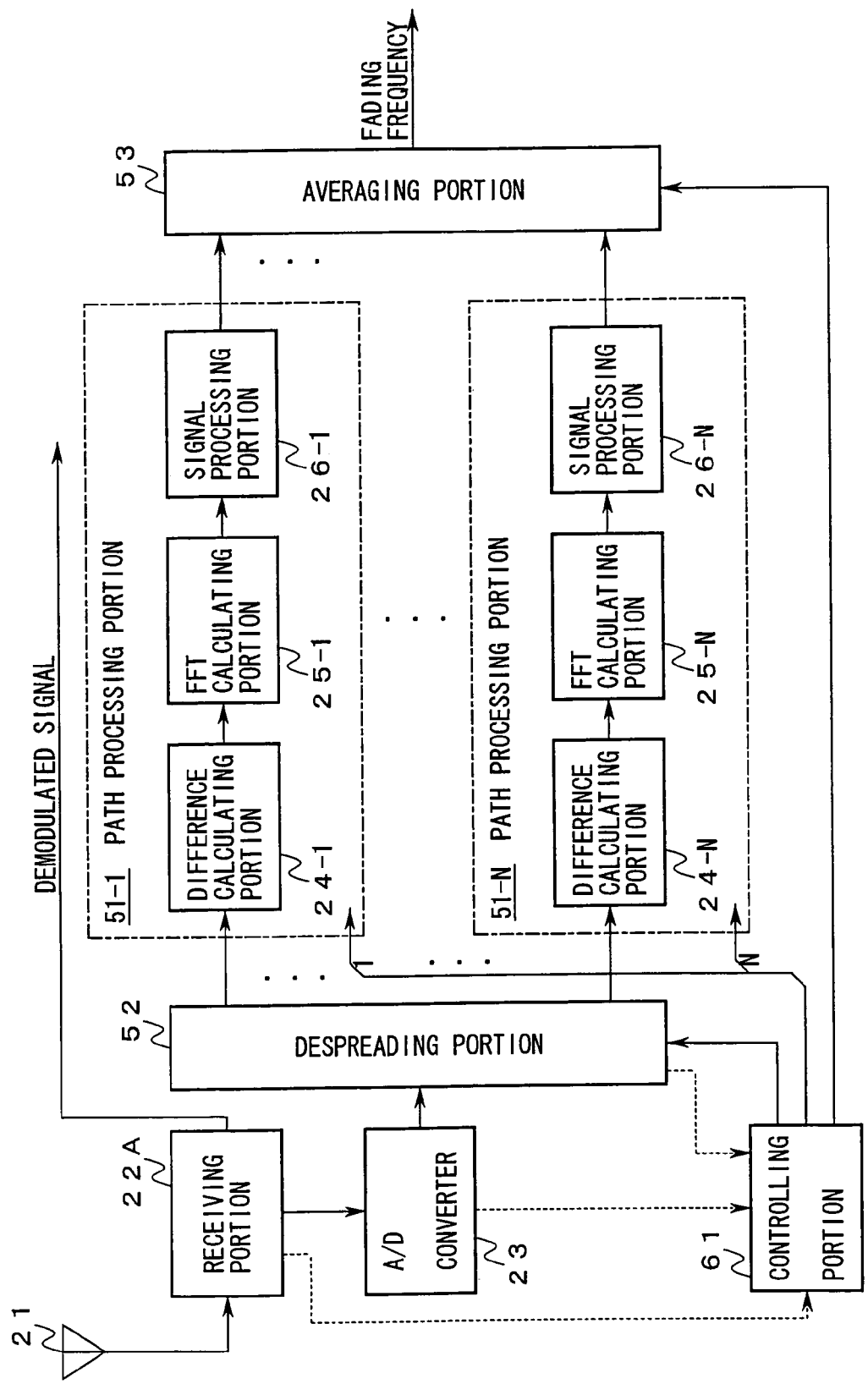
FIG. 10 is a schematic diagram showing another structure of the first embodiment to fifth embodiment of the present invention.

However, the present invention is not limited to such structures. As shown in FIG. 10, a controlling portion 61 may be disposed. In this case, the controlling portion 61 sets parameters for operation states, transmission quality of each channel, response corresponding to other factors, calculation accuracies, load allocations (required process amounts), and so forth to each portion. With the controlling portion 61, the present invention can be flexibly applied to various structures, specifications, and environments.

In addition, according to the foregoing embodiments, a frequency spectrum is obtained by performing the Fast Fourier Transform for a sequence Δ of differences. The frequency spectrum is referenced so as to estimate a fading frequency.

However, the present invention is not limited to such structures. For example, like a processing for performing the Fast Fourier Transform for two sequences of amplitudes (or estimated channel values) and then obtaining the difference in the results of the Fast Fourier Transform, a fading frequency may be estimated in accordance with an arithmetic calculation mathematically equivalent to the Fast Fourier Transform for the sequence Δ of differences.

When such an arithmetic calculation is performed, the widths W of the two windows does not always need to be the same. For example, after the results of the Fast Fourier Transform are normalized with the widths of the windows (amplitudes to be calculated or the total number of estimated channel values), a fading frequency may be estimated as the difference in the normalized results.

According to the foregoing embodiments, the present invention is applied to a receiving end that RAKE-combines radio waves of the radio transmission system in accordance with the CDMA system.

However, the present invention is not limited to such a structure. Alternatively, the present invention can be applied to a receiving end of a radio transmission system in accordance with any modulating system, any frequency allocation, and any channel allocation as well as a multiple access system.

In addition, according to the foregoing embodiments, a fading frequency is estimated in accordance with only powers of frequency spectrums obtained as results of the Fast Fourier Transform.

However, the present invention is not limited to such a structure. Alternatively, a fading frequency of fading may be estimated in accordance with a mode of fading, the structure of a radio transmission channel, two weights corresponding to characteristics and so forth (weights may be fixed or varied in accordance with an applied algorithm or the like), and a frequency spectrum calculated as the sum of products of amplitude spectrums and phase spectrums.

According to the foregoing embodiments the present invention is applied to a fading frequency of multipath fading in frequency bands higher than the UHF band.

However, the present invention is not limited to such frequency bands and fading modes. Alternatively, as long as a fading frequency needs to be effectively and accurately estimated without a complicated structure, the present invention can be flexibly applied to any radio transmission system and any radio unit.

In addition, according to the foregoing embodiments, frequency spectrums are obtained by the Fast Fourier Transform.

Alternatively, frequency spectrums can be obtained by for example any one of the following methods as long as desired accuracy and response are secured.

A substitutable arithmetic calculation such as Discrete Fourier Transform (DFT).

A combination of a comb filter having a steep pass band adjacent to a desired frequency band or a filter that performs a filtering process equivalent to the comb filter and hardware for detecting the level (amplitude) of each frequency component that is output by the hardware (all or part of the processes may be accomplished as digital signal processes).

The invention is not limited to the above embodiments and various modifications may be made without departing from the spirit and scope of the invention. Any improvement may be made in part or all of the components.

What is claimed is:

1. A fading frequency estimating apparatus, comprising:
a frequency analyzing section which obtains, at two instances, a frequency spectrum of a sequence of differences in instantaneous values of envelop components from components of signals that chronologically arrive through a radio transmission channel, the two instances being apart from each other with an interval necessary for a characteristic of a radio transmission channel to be considered steady; and
an estimating section which estimates a frequency of fading that occurs on the radio transmission channel to be such a frequency that a magnitude of the frequency spectrum is to be maximum.

2. A fading frequency estimating apparatus, comprising:
a frequency analyzing section which obtains, over two periods, frequency spectrums of signals that chronologically arrive through a radio transmission channel, the two periods being such that both or one of start points and end points of the periods are apart from each other on a time axis with an interval necessary for a characteristic of a radio transmission channel to be considered steady; and
an estimating section which estimates a frequency of fading that occurs on the radio transmission channel to be such a frequency that a difference in the frequency spectrums is to be maximum.

3. A fading frequency estimating apparatus, comprising:
a frequency analyzing section which obtains, at two instances, a frequency spectrum of a sequence of differences in chronologically estimated channel values of a radio transmission channel, the two instances being apart from each other with an interval necessary for a characteristic of the radio transmission channel to be considered steady; and
an estimating section which estimates a frequency of fading that occurs on the radio transmission channel to be a such frequency that a magnitude of the frequency spectrum is to be maximum.

4. A fading frequency estimating apparatus, comprising:
a frequency analyzing section which obtains, over two periods, a difference in frequency spectrums of sequences of chronologically estimated channel values of a radio transmission channel, the two periods being such that both or one of start points and end points of the periods are apart from each other on a time axis with an interval necessary for a characteristic of a radio transmission channel to be considered steady; and
an estimating section which estimates a frequency of fading that occurs on the radio transmission channel to be a such frequency that a difference in the frequency spectrums is to be maximum.

5. The fading frequency estimating apparatus as set forth in claim 3, wherein
the frequency analyzing section obtains a frequency spectrum of sequences of differences in estimated channel values for each path that forms the radio transmission channel and obtains, as a sum of the frequency spectrums, a frequency spectrum of a sequence of differences in estimated channel values of the radio transmission channel.

6. The fading frequency estimating apparatus as set forth in claim 4, wherein
the frequency analyzing section obtains the difference in frequency spectrums of sequences of estimated channel values for each path that forms the radio transmission channel and obtains, as a sum of the frequency spectrums, the difference in frequency spectrums of sequences of estimated channel values of the radio transmission channel.

7. The fading frequency estimating apparatus as set forth in claim 1, wherein
the frequency analyzing section is assigned in advance two coefficients with which a frequency spectrum is to be steep at such a frequency that the magnitude of the frequency spectrum is to be maximum; and
the frequency analyzing section obtains a frequency spectrum of sequences of differences in instantaneous values as the sum of products of these coefficients and the envelop components at the two instances.

8. The fading frequency estimating apparatus as set forth in claim 1, further comprising:

a storing section which stores in advance two coefficients with which a frequency spectrum is to be steep in accordance with the transmission quality of the radio transmission channel at such a frequency that the magnitude of the frequency spectrum is to be maximum, wherein the frequency analyzing section obtains a frequency spectrum of a sequence of differences in instantaneous values as the sum of products of the two coefficients stored in advance in the storing section in accordance with the transmission quality and envelop components at the two instances.

9. The fading frequency estimating apparatus as set forth in claim 1, wherein the estimating section estimates a frequency of fading that occurs on the radio transmission channel to be such a frequency that the magnitude of the frequency spectrum is to be maximum in a frequency band in which a change rate of the frequency spectrum is maximum.

10. The fading frequency estimating apparatus as set forth in claim 1, wherein the frequency analyzing section integrates a plurality of frequency spectrums that are obtained in advance so as to obtain a latest frequency spectrum.

11. The fading frequency estimating apparatus as set forth in claim 2, wherein the frequency analyzing section is assigned in advance two coefficients with which the difference in the frequency spectrums is to be steep at such a frequency that the magnitude of the frequency spectrum is to be maximum, and obtains the difference as the sum of products of the two coefficients and the frequency spectrums of the signals.

12. The fading frequency estimating apparatus as set forth in claim 2, further comprising:

a storing section which storing two coefficients in advance with which the difference in the frequency spectrums is to be steep in accordance with the transmission quality of the radio transmission channel at such a frequency that the magnitude of the frequency spectrum is to be maximum, wherein the frequency analyzing section obtains the difference as the sum of products of the two coefficients stored in advance in the storing section in accordance with the transmission quality and the frequency spectrums of the signals.

13. The fading frequency estimating apparatus as set forth in claim 2, wherein the estimating section estimates the frequency of the fading that occurs on the radio transmission channel to be such a frequency that the magnitude of the frequency spectrum is to be maximum in a frequency band in which a change rate of the difference in the frequency spectrum is maximum.

14. The fading frequency estimating apparatus as set forth in claim 2, wherein the frequency analyzing section integrates the plurality of frequency spectrums that are obtained in advance so as to obtain a latest frequency spectrum.

15. The fading frequency estimating apparatus as set forth in claim 3, wherein the frequency analyzing section is assigned in advance two coefficients with which the frequency spectrum is to be steep at such a frequency that the magnitude of the frequency spectrum is to be maximum, and obtains the frequency spectrum of the sequence of the differences in the instantaneous values as the sum of products of the coefficients and estimated channel values estimated at the two instances.

16. The fading frequency estimating apparatus as set forth in claim 3, further comprising:

a storing section which stores in advance two coefficients with which the frequency spectrum is to be steep in accordance with the transmission quality of the radio transmission channel at such a frequency that the magnitude of the frequency spectrum is to be maximum, wherein the frequency analyzing section obtains the frequency spectrum of the sequence of the differences in the instantaneous values as the sum of products of the two coefficients stored in advance in the storing section in accordance with the transmission quality and estimated channel values estimated at the two instances.

17. The fading frequency estimating apparatus as set forth in claim 3, wherein the estimating section estimates the frequency of the fading that occurs on the radio transmission channel to be such a frequency that the magnitude of the frequency spectrum is to be maximum in a frequency band in which a change rate of the frequency spectrum is maximum.

18. The fading frequency estimating apparatus as set forth in claim 3, wherein the frequency analyzing section integrates a plurality of frequency spectrums obtained in advance so as to obtain a latest frequency spectrum.

19. The fading frequency estimating apparatus as set forth in claim 4, wherein the frequency analyzing section is assigned in advance two coefficients with which the difference in the frequency spectrums is to be steep such a frequency that a difference in the frequency spectrums is to be maximum, and obtains the difference as the sum of products of the two coefficients and the frequency spectrums of the sequences of the estimated channel values of the radio transmission channel in the different periods.

20. The fading frequency estimating apparatus as set forth in claim 4, further comprising:

a storing section which stores in advance two coefficients with which the difference in the frequency spectrums is to be steep in accordance with the transmission quality of the radio transmission channel at such a frequency that a difference in the frequency spectrums is to be maximum, wherein the frequency analyzing section obtains the difference as the sum of products of the two coefficients stored in advance in the storing section in accordance with the transmission quality and the frequency spectrums of the sequences of the estimated channel values of the radio transmission channel estimated in the two periods.

21. The fading frequency estimating apparatus as set forth in claim 4, wherein the estimating section estimates the frequency of the fading that occurs on the radio transmission channel to be such a frequency that a difference in the frequency spectrums is to be maximum in a frequency band in which a change rate of the difference in the frequency spectrums is maximum.

22. The fading frequency estimating apparatus as set forth in claim 4, wherein the frequency analyzing section integrates a plurality of frequency spectrums obtained in advance so as to obtain a latest frequency spectrum.

23. The fading frequency estimating apparatus as set forth in claim 1, wherein
the frequency analyzing section chronologically and repeatedly obtains frequency spectrums; and
the estimating section estimates the fading frequency to be an average value of such frequencies that each magnitude of the plurality of frequency spectrums obtained by the frequency analyzing section is to be maximum.

24. The fading frequency estimating apparatus as set forth in claim 2, wherein
the frequency analyzing section chronologically and repeatedly obtains frequency spectrums of the signals in each of the two periods; and
the estimating section estimates the fading frequency to be an average value of such frequencies that the differences in the frequency spectrums obtained by the frequency analyzing section each are to be maximum in each of the two periods.

25. The fading frequency estimating apparatus as set forth in claim 3, wherein
the frequency analyzing section chronologically and repeatedly obtains frequency spectrums; and
the estimating section estimates a fading frequency to be an average value of such frequencies that the magnitudes of the plurality of frequency spectrums obtained by the frequency analyzing section each are to be maximum.

26. The fading frequency estimating apparatus as set forth in claim 4, wherein
the frequency analyzing section chronologically and repeatedly obtains the frequency spectrums of the signals in each of the two periods; and
the estimating section estimates a fading frequency to be an average value of such frequencies that the differences in the frequency spectrums obtained by the frequency analyzing section in each of the two periods each are to be maximum.

27. The fading frequency estimating apparatus as set forth in claim 25, wherein
the frequency analyzing section chronologically and repeatedly obtains the frequency spectrums for each path that forms the radio transmission channel; and
the estimating manes estimates a fading frequency to be an average value of such frequencies that the magnitudes of the plurality of frequency spectrums obtained for each of the paths by the frequency analyzing section each are to be maximum.

28. The fading frequency estimating apparatus as set forth in claim 26, wherein:
the frequency analyzing section chronologically and repeatedly obtains frequency spectrums of the signals for each of the paths that forms the radio transmission channel in each of the two periods; and
the estimating section estimates a fading frequency to be an average value of such frequencies that the differences in frequency spectrums obtained by the frequency analyzing section for each path and in each of the two periods each are to be maximum.

* * * * *